(12) United States Patent
Kobayashi et al.

(10) Patent No.: US 10,471,555 B2
(45) Date of Patent: Nov. 12, 2019

(54) METHOD FOR MANUFACTURING ANNULAR MEMBER

(71) Applicant: NSK Ltd., Shinagawa-ku, Tokyo (JP)

(72) Inventors: Kazuto Kobayashi, Kanagawa (JP); Yuu Yasuda, Kanagawa (JP)

(73) Assignee: NSK Ltd., Tokyo (JP)

( * ) Notice: Subject to any disclaimer, the term of this patent is extended or adjusted under 35 U.S.C. 154(b) by 638 days.

(21) Appl. No.: 15/035,270

(22) PCT Filed: Nov. 26, 2014

(86) PCT No.: PCT/JP2014/005915
§ 371 (c)(1),
(2) Date: May 9, 2016

(87) PCT Pub. No.: WO2015/079684
PCT Pub. Date: Jun. 4, 2015

(65) Prior Publication Data
US 2016/0288273 A1     Oct. 6, 2016

(30) Foreign Application Priority Data

Nov. 28, 2013 (JP) ................... 2013-246344
Mar. 17, 2014 (JP) ................... 2014-052976

(51) Int. Cl.
  *B23P 15/00* (2006.01)
  *B23D 21/00* (2006.01)
  (Continued)

(52) U.S. Cl.
  CPC .............. *B23P 15/003* (2013.01); *B21H 1/12* (2013.01); *B21H 7/182* (2013.01); *B23D 21/00* (2013.01); *F16C 33/64* (2013.01); *B21H 1/06* (2013.01)

(58) Field of Classification Search
  CPC .............. F16C 2220/80; F16C 2220/82; F16C 2220/40; F16C 2220/44; F16C 2220/42; B21H 1/12; B21H 7/182
  See application file for complete search history.

(56) References Cited

U.S. PATENT DOCUMENTS 771,752 A    10/1904  Stafford
5,868,050 A   2/1999  Feldmeier
(Continued)

FOREIGN PATENT DOCUMENTS

CN    87 2 01447 U    9/1988
CN    1035971 A      10/1989
(Continued)

OTHER PUBLICATIONS

Machine Translation of JP2010082710A, Sekido, Kunio. Apr. 2010. "Cutting Device for Cylindrical Material".*
(Continued)

*Primary Examiner* — David P Bryant
*Assistant Examiner* — Nirvana Deonauth
(74) *Attorney, Agent, or Firm* — Crowell & Moring LLP

(57) ABSTRACT

A method for manufacturing an annular member includes: a cylindrical member forming step of forming a cylindrical member with an annular shape from a round bar material; and a cutting and separating step of cutting and separating the cylindrical member over an axial direction of the cylindrical member while rotating the cylindrical member, the cylindrical member being cut and separated by a shear force obtained by restraining molds, which apply an urging force to an outer circumferential surface of the cylindrical member, and by a restraining mold, which is provided with a gap on the outer circumferential surface of the cylindrical member, among a plurality of restraining molds provided on an inner circumferential surface side and an outer circumfer-
(Continued)

ential surface side of the cylindrical member along the axial direction, to obtain a plurality of annular members.

8 Claims, 11 Drawing Sheets

(51) Int. Cl.
*B21H 1/12* (2006.01)
*B21H 7/18* (2006.01)
*F16C 33/64* (2006.01)
*B21H 1/06* (2006.01)

(56) References Cited

U.S. PATENT DOCUMENTS

| | | |
|---|---|---|
| 5,979,205 A | 11/1999 | Uchida et al. |
| 6,098,436 A | 8/2000 | Girardello et al. |

FOREIGN PATENT DOCUMENTS

| | | | |
|---|---|---|---|
| CN | 201235417 Y | | 5/2009 |
| JP | 49-22022 B | | 6/1974 |
| JP | 50-19082 A | | 2/1975 |
| JP | 58-82617 A | | 5/1983 |
| JP | 3-120318 U | | 12/1991 |
| JP | 4-210318 A | | 7/1992 |
| JP | 9-512487 A | | 12/1997 |
| JP | 11-33818 A | | 2/1999 |
| JP | 11033818 A | * | 2/1999 |
| JP | 11-197951 A | | 7/1999 |
| JP | 2002-317823 A | | 10/2002 |
| JP | 2004-209565 A | | 7/2004 |
| JP | 4016136 B2 | | 12/2007 |
| JP | 2009-82930 A | | 4/2009 |
| JP | 2010-82710 A | | 4/2010 |
| JP | 2010082710 A | * | 4/2010 |
| JP | 2011-131251 A | | 7/2011 |
| JP | 2011131251 A | * | 7/2011 |

OTHER PUBLICATIONS

Machine Translation of JP2011131251A. Kobayashi, Kazuto et al. Jul. 2011 "Method of Manufacturing Base Stock for Ring".*
Machine Translation of JP11033818A. Matsumiya, Shigeyuki. Feb. 1999. "Cutting Method and Device for Long-Stretching Material".*
Chinese-language Office Action issued in counterpart Chinese Application No. 201480059817.4 dated Mar. 2, 2017 with partial English translation (11 pages).
International Preliminary Report on Patentability (PCT/IB/338 & PCT/IB/373) issued in PCT Application No. PCT/JP2014/005915 dated Jun. 9, 2016, including English translation of document C2 (Japanese-language Written Opinion (PCT/ISA/237)) previously filed on May 9, 2016 (nine (9) pages).
International Search Report (PCT/ISA/210) issued in PCT Application No. PCT/JP2014/005915 dated Feb. 24, 2015, with English translation (four (4) pages).
Japanese-language Written Opinion (PCT/ISA/237) issued in PCT Application No. PCT/JP2014/005915 dated Feb. 24, 2015 (five (5) pages).
European Search Report issued in counterpart European Application No. 14866645.6 dated Dec. 1, 2016 (nine pages).
Japanese Office Action issued in counterpart Japanese Application No. 2015-550565 dated Feb. 7, 2017 with partial English translation (eight pages).

* cited by examiner

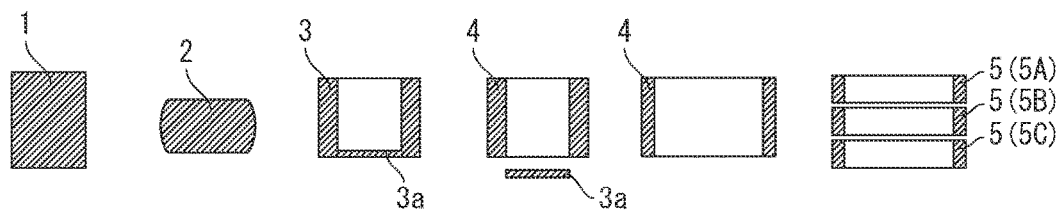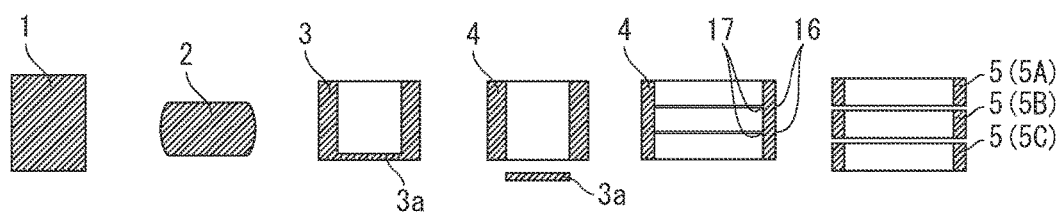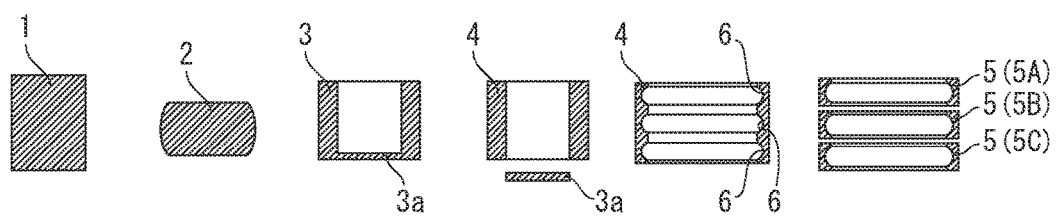

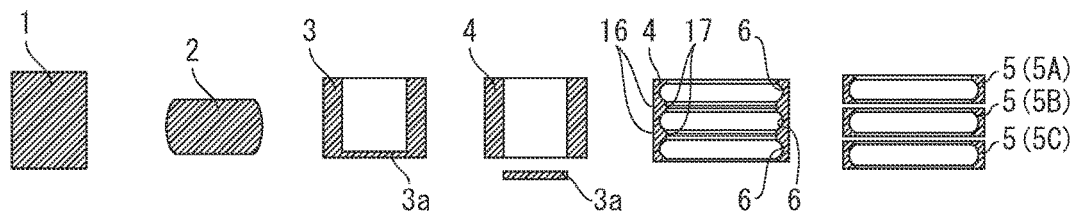
FIG.15A FIG.15B FIG.15C FIG.15D FIG.15E FIG.15F
FIG.16
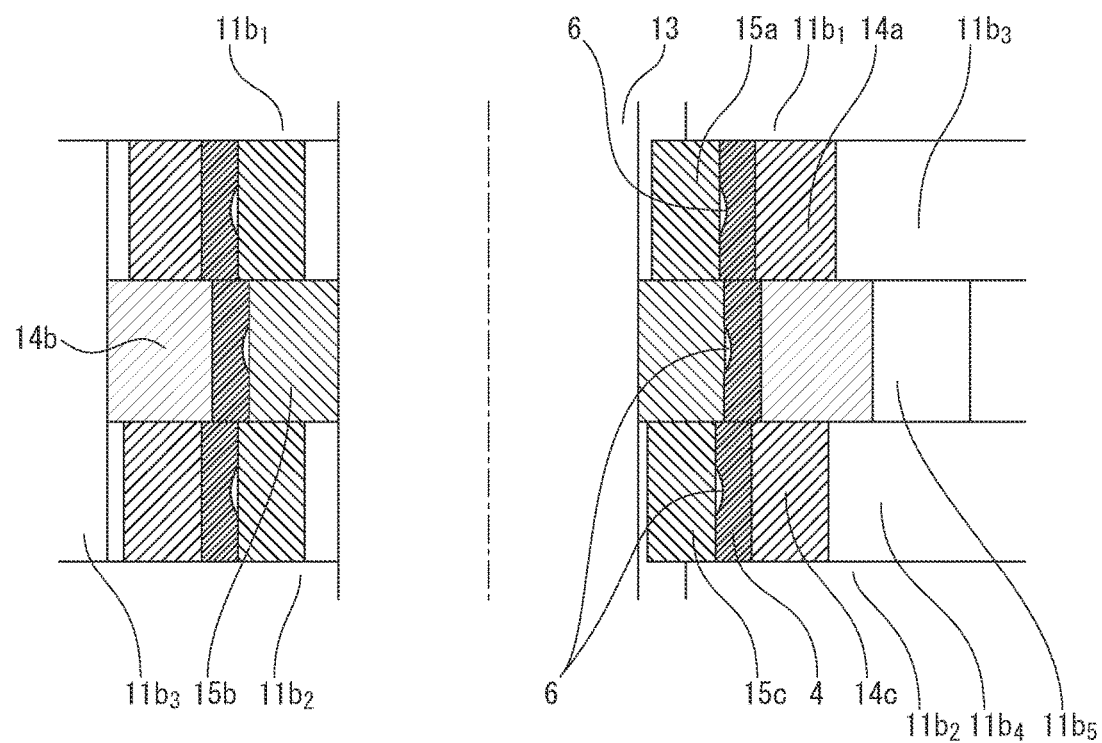

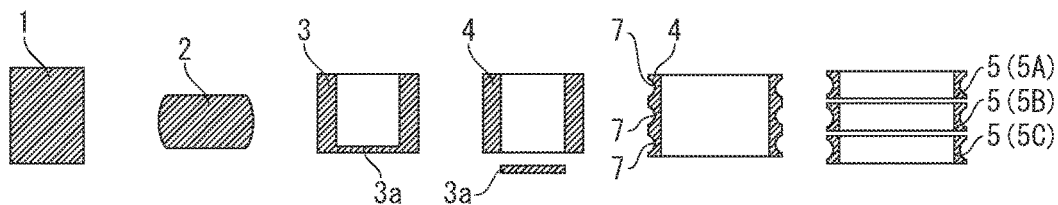
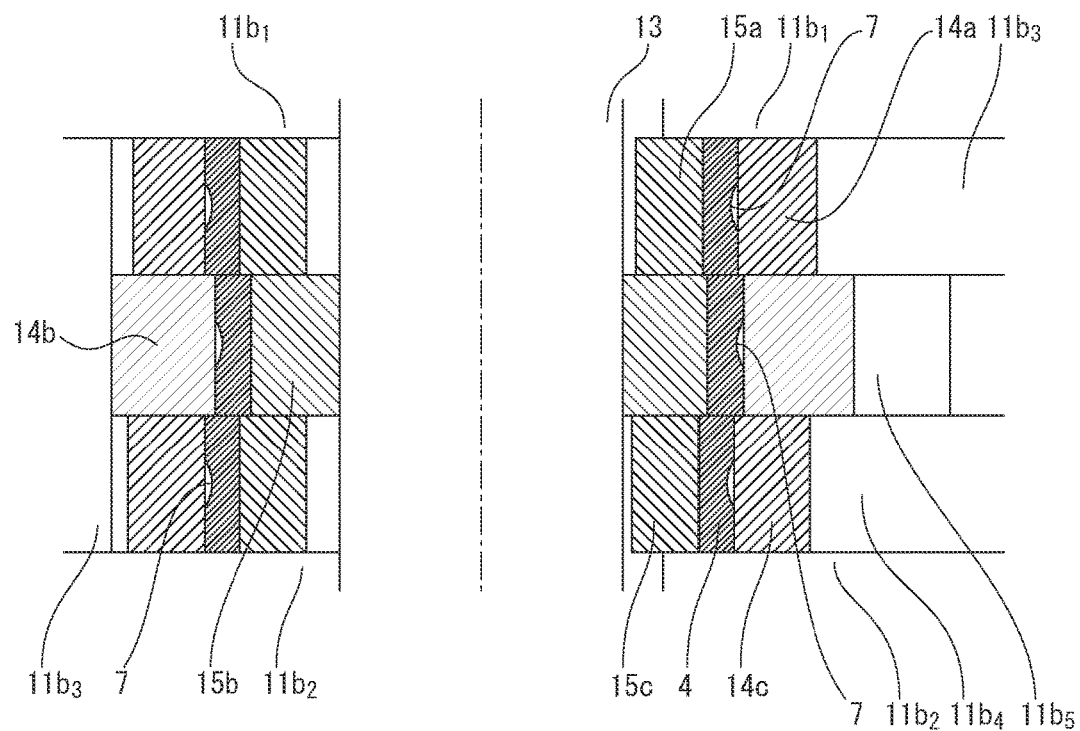

METHOD FOR MANUFACTURING ANNULAR MEMBER

TECHNICAL FIELD

The present invention relates to a method for manufacturing an annular member, and for example, relates to a method for manufacturing an annular member applied to an inner ring or outer ring of a roller bearing or the like.

BACKGROUND ART

Heretofore, as a method for manufacturing an annular member applied to an inner ring or outer ring of a roller bearing or the like, a process shown in FIGS. 20A to 20E is mentioned. First, by using a round bar member 101 shown in FIG. 20A, a cut billet 102 shown in FIG. 20B is made by any method of press cutting, saw cutting and cutting-off. At this time, in a case where the cut billet 102 is cut out by the press cutting, surface roughness of a cutting section thereof is not acceptable, and accordingly, a crack is prone to occur therein, and a perpendicularity of the cutting section to an axial direction thereof is poor. Therefore, upsetting or end surface correction is performed for the cut billet 102.

Next, as shown in FIG. 20C, the cut billet 102 is subjected to backward extrusion, whereby a backward extrusion billet 103, which forms a top-opened and bottomed cylindrical shape, is formed.

Next, as shown in FIG. 20D, a bottom portion 103a of the backward extrusion billet 103 is penetrated, and a cylindrical member (pipe-like member) 104 is formed.

Next, as shown in FIG. 20E, the cylindrical member 104 is subjected to shear cutting, cutting-off or saw cutting (cutting) over an axial direction thereof, whereby a plurality of annular members (ring-like members) 105 is fabricated.

Here, Patent Literature 1 and Patent Literature 2 disclose a technology regarding the shear cutting mentioned as a technology for cutting the cylindrical member 104 over the axial direction thereof and dividing the cylindrical member 104 into the plurality of annular members. The technology disclosed in Patent Literature 1 and Patent Literature 2 is a technology for bringing a cored bar into intimate contact with an inner circumferential surface of a cylindrical member (pipe-like member) and shearing the cylindrical member (pipe-like member) by using a tapered wedge. Moreover, Patent Literature 3 discloses a technology for cutting the cylindrical member by using an expansion blade as the technology for cutting the cylindrical member (pipe-like member) over the axial direction thereof and dividing the cylindrical member into the plurality of annular members.

CITATION LIST

Patent Literature

PTL 1: JP S49-22022 B
PTL 2: JP H04-210318 A
PTL 3: JP 2004-209565 A

SUMMARY OF INVENTION

Technical Problem

However, in the method of obtaining the annular member from the cylindrical member by the shear cutting, yield therein has been good; however, deformation of the obtained annular member has been inevitable. Specifically, in accordance with the technologies described in Patent Literature 1 and Patent Literature 2, the inner circumferential surface of the cylindrical member has been tightly restrained; however, the cylindrical member has been sheared by a motion in one direction, and accordingly, an unbalanced force has been applied to the cylindrical member to a great extent, and the cylindrical member has become ellipsoidal. Moreover, the method of obtaining the annular member from the cylindrical member by the shear cutting has had room for consideration of an occurrence of shape sagging and a burr (refer to a portion s of FIG. 20E).

Meanwhile, in accordance with the method of obtaining the annular member by the cutting-off or the saw cutting, the annular member has avoided being deformed; however, a portion remaining as a result of shaving the annular member has sometimes been useless.

Moreover, in accordance with the technology described in Patent Literature 3, since the cylindrical member has been expanded in diameter, there has been a problem that a dimension and shape of the cylindrical member is not stabilized.

That is to say, there has been room for consideration of the technology for obtaining the plurality of annular members by cutting the cylindrical member with good yield and with high dimensional accuracy.

In this connection, the present invention has been made by focusing on the problem described above, and it is an object of the present invention to provide a method for manufacturing an annular member with good yield and high dimensional accuracy.

Solution to Problem

In order to achieve the above object, an aspect of a method for manufacturing an annular member includes: a cylindrical member forming step of forming a cylindrical member with an annular shape from a round bar material; and a cutting and separating step of cutting and separating the cylindrical member over an axial direction of the cylindrical member while rotating the cylindrical member, the cylindrical member being cut and separated by a shear force obtained by a restraining mold, which applies an urging force to an outer circumferential surface of the cylindrical member, and by a restraining mold, which is provided with a gap on the outer circumferential surface of the cylindrical member, among a plurality of restraining molds provided on an inner circumferential surface side and an outer circumferential surface side of the cylindrical member along the axial direction, to obtain a plurality of annular members.

In addition, another aspect of an aspect of a method for manufacturing an annular member includes: a cylindrical member forming step of forming a cylindrical member with an annular shape from a round bar material; a notch forming step of forming a notch on at least either one of an inner circumferential surface and an outer circumferential surface of the cylindrical member; and a cutting and separating step of cutting and separating the cylindrical member over an axial direction of the cylindrical member while rotating the cylindrical member, the cylindrical member being cut and separated by causing a stress concentration on a spot where the notch is formed, by a shear force obtained by a restraining mold, which applies an urging force to the outer circumferential surface of the cylindrical member, and by a restraining mold, which is provided with a gap on the outer circumferential surface of the cylindrical member, among a plurality of restraining molds provided on inner circumferential surface side and an outer circumferential surface side of the cylindrical member along the axial direction, to obtain a plurality of annular members.

The above mentioned method for manufacturing the annular member may include a groove forming step of forming grooves on the inner circumferential surface or the outer circumferential surface of the cylindrical member simultaneously by single rolling molding, the groove forming step being provided between the cylindrical member forming step and the cutting and separating step.

In the above mentioned method for manufacturing the annular member, a cross-sectional shape of a bottom portion of the notch may be a U-shape.

In the above mentioned method for manufacturing the annular member, a cross-sectional shape of a bottom portion of the notch may be a rectangular shape.

In the above mentioned method for manufacturing the annular member, a cross-sectional shape of a bottom portion of the notch may be a V-shape.

Advantageous Effects of Invention

In accordance with the aspect of the present invention, there can be provided the method for manufacturing the annular member with good yield and high dimensional accuracy.

BRIEF DESCRIPTION OF DRAWINGS

FIG. 2A is a plan view; and FIG. 2B is a side surface portion cross-sectional view;

FIGS. 12A to 12F are cross-sectional views showing an outline of machining of an annular member in a third embodiment of the method for manufacturing an annular member;

FIGS. 13A to 13F are cross-sectional views showing an outline of machining of an annular member in a fourth embodiment of the method for manufacturing an annular member;

FIGS. 14A to 14F are cross-sectional views showing an outline of machining of an annular member in a fifth embodiment of the method for manufacturing an annular member;

FIGS. 15A to 15F are cross-sectional views showing an outline of machining of an annular member in a sixth embodiment of the method for manufacturing an annular member;

FIG. 16 is a principal portion enlarged view showing a machining state in the fifth embodiment and sixth embodiment of the method for manufacturing an annular member;

FIGS. 17A to 17F are cross-sectional views showing an outline of machining of an annular member in a seventh embodiment of the method for manufacturing an annular member;

FIG. 18 is a principal portion enlarged view showing a machining state in the seventh embodiment of the method for manufacturing an annular member;

DESCRIPTION OF EMBODIMENTS

In the following detailed description, many specific details are described so as to provide perfect understanding of embodiments of the present invention. However, it will be obvious that one or more embodiments can be embodied without such specific details. In addition, in order to simplify the drawings, well-known structures and devices are illustrated by simplified diagrams.

A description is made below of embodiments of a method for manufacturing an annular member according to the present invention with reference to the drawings.

First Embodiment

FIGS. 1A to 1E are cross-sectional views showing an outline of machining of an annular member in a first embodiment of the method for manufacturing an annular member.

The method for manufacturing an annular member of this embodiment includes a cylindrical member forming step and a cutting and separating step. This embodiment has a special technical feature in this cutting and separating step.

<Cylindrical Member Forming Step>

The cylindrical member forming step is a step of forming a cylindrical member with an annular shape from a round bar material.

Figures 1A, 1B, 1C, 1D, 1E:
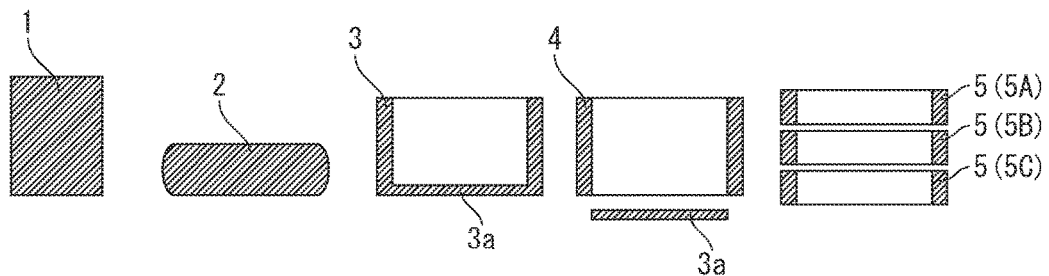
FIGS. 1A to 1E are cross-sectional views showing an outline of machining of an annular member in a first embodiment of a method for manufacturing an annular member.

First, by using a round bar member 1 shown in FIG. 1A, a cut billet 2 shown in FIG. 1B is made by any method of press cutting, saw cutting and cutting-off. At this time, in a case where the cut billet 2 is cut out by the press cutting, surface roughness of a cutting section thereof is not acceptable, and accordingly, a crack is prone to occur therein, and a perpendicularity of the cutting section to an axial direction thereof is poor. Therefore, upsetting or end surface correction is performed for the cut billet 2. Note that, in a case where the cut billet 2 is obtained by the saw cutting or the cutting-off, the roughness of the cutting section is acceptable, and a perpendicularity of the cutting section with respect to a billet axis direction is good, and accordingly, the upsetting and the end surface correction do not have to be performed.

Next, as shown in FIG. 1C, the cut billet 2 is subjected to backward extrusion, whereby a backward extrusion billet 3, which forms a top-opened and bottomed cylindrical shape, is molded. In this backward extrusion, a load and a surface pressure, which are applied to the backward extrusion billet 3, are high, and accordingly, molding is performed with a reduced load and a low surface pressure while decreasing deformation resistance.

Next, as shown in FIG. 1D, a bottom portion 3a of the backward extrusion billet 3 is penetrated, and a cylindrical member (pipe-like member) 4 is formed.

<Cutting and Separating Step>

The cutting and separating step is a step of cutting the cylindrical member 4 over an axial direction thereof and obtaining a plurality of annular members (ring-like members) 5 as shown in FIG. 1E. Specifically, the cutting and separating step is a step of rotating the cylindrical member 4, and cutting and separating the cylindrical member 4 over the axial direction of the cylindrical member 4 by a shear force obtained by restraining molds, which apply an urging force to an outer circumferential surface of the cylindrical member 4, and by a restraining mold, which is provided with a gap on the outer circumferential surface, among restraining molds provided in plural on an inner circumferential surface side and outer circumferential surface side of the cylindrical member 4 over the axial direction, and thereby obtaining a plurality of annular members 5A, 5B and 5C.

Figure 2A:
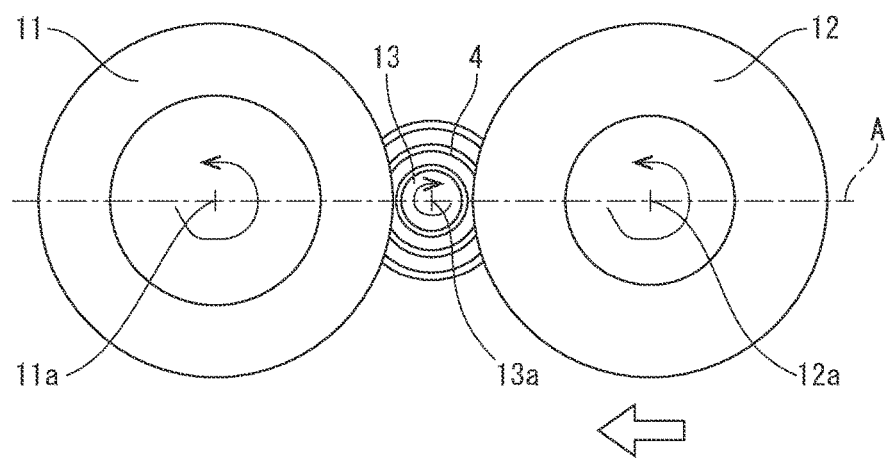
FIGS. 2A and 2B are views showing a configuration of a machining device in the first embodiment of the method for manufacturing an annular member.
Figure 2B:
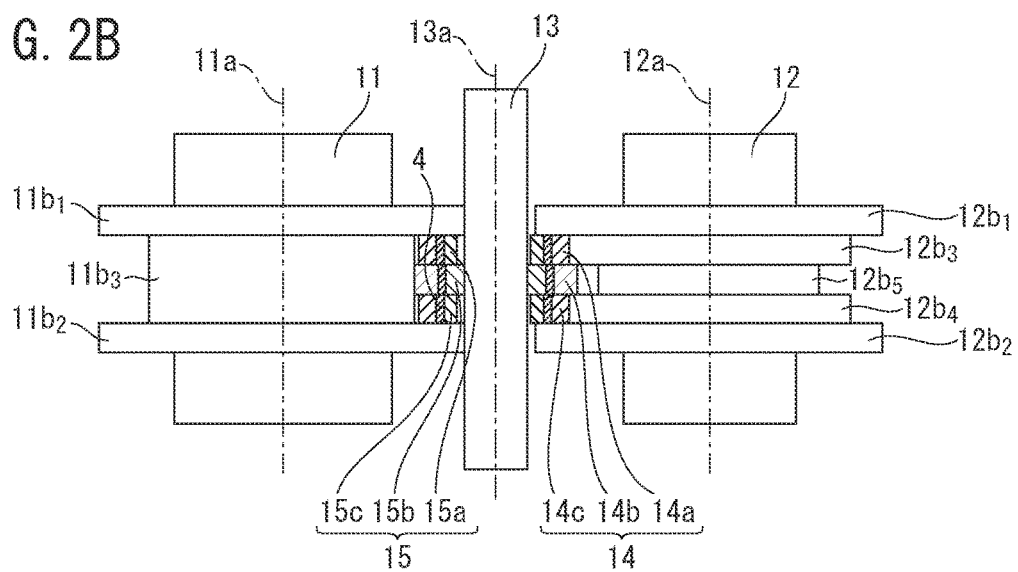
Figure 3:
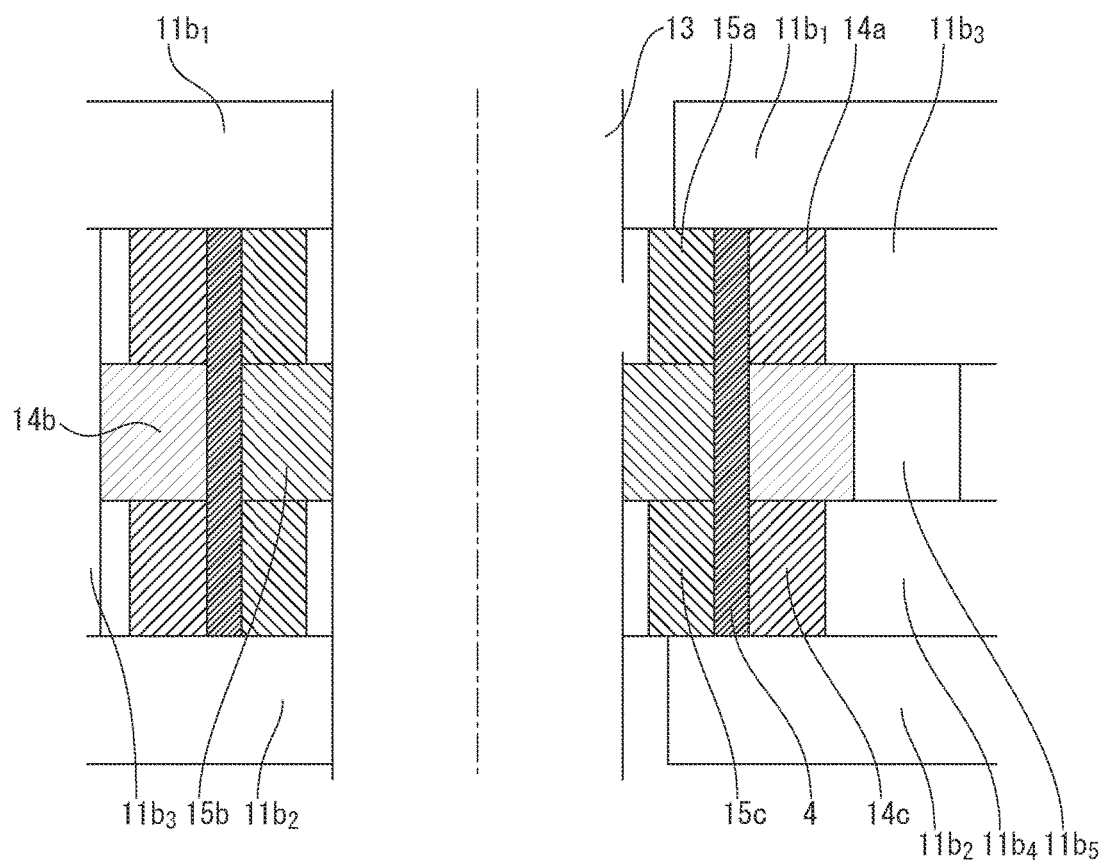
FIG. 3 is a principal portion enlarged view showing a machining state in the first embodiment of the method for manufacturing an annular member.

This cutting and separating step is implemented by using a cutting and separating device 10 shown in FIGS. 2A and 2B and FIG. 3. The cutting and separating device 10 includes a first roll 11, a second roll 12 and a mandrel 13. In the following description, a mode of dividing the cylindrical member 4 as an object to be machined (that is, a work) into three in the axial direction thereof is described.

[Overall Configuration]

The first roll 11, the mandrel 13 and the second roll 12 have predetermined intervals therebetween so that respective rotation axes 11a, 13a and 12a can be arrayed side by side on an installation axis A, and are provided in this order so as to be individually rotatable actively, or to be individually rotatable passively. Here, it is defined that at least either one of the first roll 11 and the second roll 12 has a drive source of rotation. Moreover, at least either one of the first roll 11 and the second roll 12 is installed so that at least either one of the rotation axis 11a of the first roll 11 and the rotation axis 12a of the second roll 12 can be capable of making a translational motion on the installation axis A.

The description is made of this embodiment on the assumption that each of the first roll 11 and the second roll 12 has a drive source exclusive thereto and is made actively rotatable, and that the mandrel 13 is installed so as to abut against the first roll 11 and to be made passively rotatable. Moreover, the description is made of this embodiment on the assumption that only the second roll 12 is installed so that the rotation axis 12a thereof can be capable of making the translational motion on the installation axis A on this installation axis A, and on the assumption that the rotation axis 11a of the first roll 11 and the rotation axis 13a of the mandrel 13 are fixed.

[Restraining Mold]

Moreover, on the outer circumferential surface side of the cylindrical member 4, the restraining molds 14 which restrain the outer circumferential surface of the cylindrical member 4 as the object to be machined (that is, the work) are provided while individually forming an annular shape. These restraining molds 14 are made of a plurality of such restraining molds 14, the number of which is determined based on how many pieces the cylindrical member 4 is to be divided into in the axial direction. For example, in a case of dividing the cylindrical member 4 into three in the axial direction thereof as shown in FIG. 2B and FIG. 3, restraining molds 14a, 14b and 14c are provided while thicknesses thereof are being differentiated from one another in a radial direction.

Moreover, on the inner circumferential surface side of the cylindrical member 4, as shown in FIG. 2B and FIG. 3, the restraining molds 15 which restrain the inner circumferential surface of the cylindrical member 4 are provided while individually forming an annular shape. In a similar way to the restraining molds 14, these restraining molds 15 are made of a plurality of such restraining molds 15, the number of which is determined based on how many pieces the cylindrical member 4 is to be divided into in the axial direction. For example, the restraining molds 15a, 15b and 15c are provided so as to abut against the inner circumferential surface of the cylindrical member 4 at heights in the axial direction, which individually correspond to the restraining molds 14a, 14b and 14c.

Moreover, not only the restraining molds 15a, 15b and 15c are provided while differentiating widths thereof in the radial direction from one another, but also, preferably, one thereof (for example, the restraining mold 15b) is fitted to the mandrel 13.

[Restricting Portions and Urging Portion]

Moreover, in the first roll 11 fixed on the installation axis A, disc-shaped restricting portions $11b_1$ and $11b_2$, which fix the cylindrical member 4, and a columnar urging portion $11b_3$, which applies the urging force to the restraining molds 14a, 14b and 14c, are provided coaxially with the first roll 11. The restricting portion $11b_1$ is provided so as to abut against an upper end surface of the cylindrical member 4 and to restrict an upward motion of the cylindrical member 4.

Moreover, the restricting portion $11b_2$ is provided so as to abut against a lower end surface of the cylindrical member 4 and to restrict a downward motion of the cylindrical member 4. Furthermore, the urging portion $11b_3$ is provided between the restricting portion $11b_1$ and the restricting portion $11b_2$, and is provided so as to apply the urging force to the restraining mold 14b. Here, a diameter of each of the restricting portions $11b_1$ and $11b_2$ is set larger than a diameter of the urging portion $11b_3$.

Moreover, in the second roll 12 made movable along the installation axis A, disc-shaped restricting portions $12b_1$ and $12b_2$, which fix the cylindrical member 4, and disc-shaped urging portions $12b_3$ and $12b_4$, which apply the urging force to the restraining molds 14a and 14c, are provided coaxially with the second roll 12. The restricting portion $12b_1$ is provided so as to abut against the upper end surface of the cylindrical member 4 and to restrict the upward motion of the cylindrical member 4. Moreover, the restricting portion $12b_2$ is provided so as to abut against the lower end surface of the cylindrical member 4 and to restrict the downward motion of the cylindrical member 4.

Moreover, the urging portion $12b_3$ is provided so as to apply the urging force to the restraining mold $14a$. Furthermore, the urging portion $12b_4$ is provided so as to apply the urging force to the restraining mold $14c$. Moreover, between the urging portion $12b_3$ and the urging portion $12b_4$, a cushioning portion $12b_5$ is provided with a predetermined gap from the restraining mold $14b$. Here, diameters of the restricting portions $12b_1$ and $12b_2$ are set larger than diameters of the urging portions $12b_3$ and $12b_4$, and the diameters of the urging portions $12b_3$ and $12b_4$ are set larger than a diameter of the cushioning portion $12b_5$.

Figure 4:
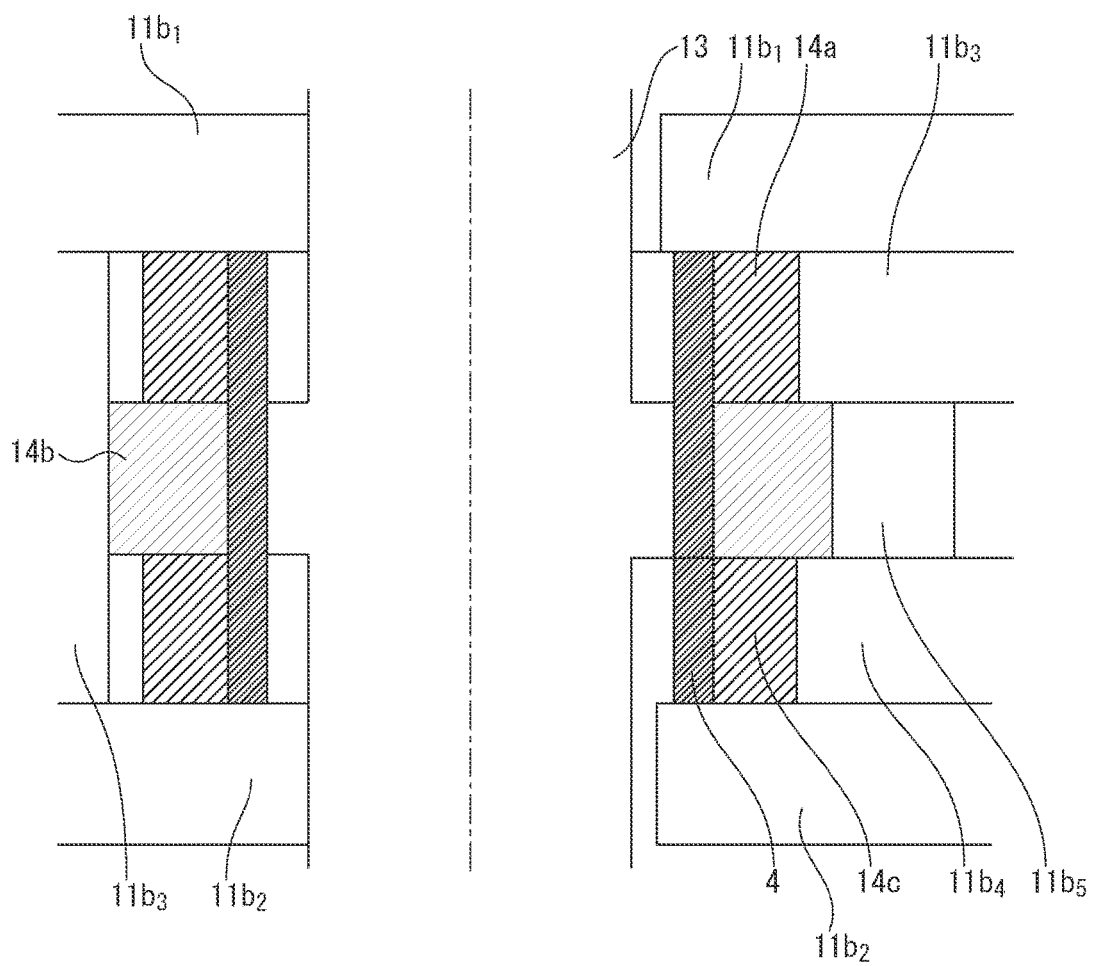
FIG. 4 is a principal portion enlarged view showing a machining state in another embodiment of the method for manufacturing an annular member.

Here, in the cylindrical member 4 in this embodiment, as shown in FIG. 3, the inner circumferential surface and outer circumferential surface thereof are restrained by the restraining molds 14 and 15, which make pairs the number of which is equivalent to the number of annular members (ring-like members) 5 desired to be finally obtained. However, in a case where deformation of the cylindrical member 4 can be suppressed sufficiently, then as shown in FIG. 4, an annular protruding portion $13b$ having a similar function to that of the restraining mold $15b$ may be provided on the mandrel 13.

Next, a specific description is made of the cutting and separating step performed by the cutting and separating device 10 shown in FIGS. 2A and 2B and FIG. 3.

First, as shown in FIG. 3, the cylindrical member 4 as the object to be machined is installed so that the mandrel 13 can be inserted through the inner circumferential surface side thereof, and the restraining molds $15a$, $15b$ and $15c$ are installed between the cylindrical member 4 and the mandrel 13. In this event, the restraining mold $15b$ is installed so that the mandrel 13 can be fitted to the inner circumferential surface thereof, and that the outer circumferential surface thereof can be fitted to the inner circumferential surface of the cylindrical member 4.

Next, as shown in FIG. 3, the restraining molds $14a$, $14b$ and $14c$ are installed on the outer circumferential surface side of the cylindrical member 4. In this event, the restraining mold $14b$ is provided so that the inner circumferential surface thereof can abut against the outer circumferential surface of the cylindrical member 4, and in addition, that the outer circumferential surface thereof can abut against an outer circumferential surface of the urging portion $11b_3$ of the first roll 11. Note that a reason why the restraining mold $14b$ among the restraining molds $14a$, $14b$ and $14c$ is allowed to abut against the cylindrical member 4 and the urging portion $11b_3$ is that, in the second roll 12, the cushioning portion $12b_5$ is provided with the predetermined gap from the restraining mold $14b$.

The cylindrical member 4 installed as described above rotates together with the mandrel 13 following the rotation of the first roll 11 (a direction of the rotation is illustrated in FIG. 2A), and allows the second roll 12, which rotates in a similar way, to make the translational motion along the installation axis A.

Figure 5:
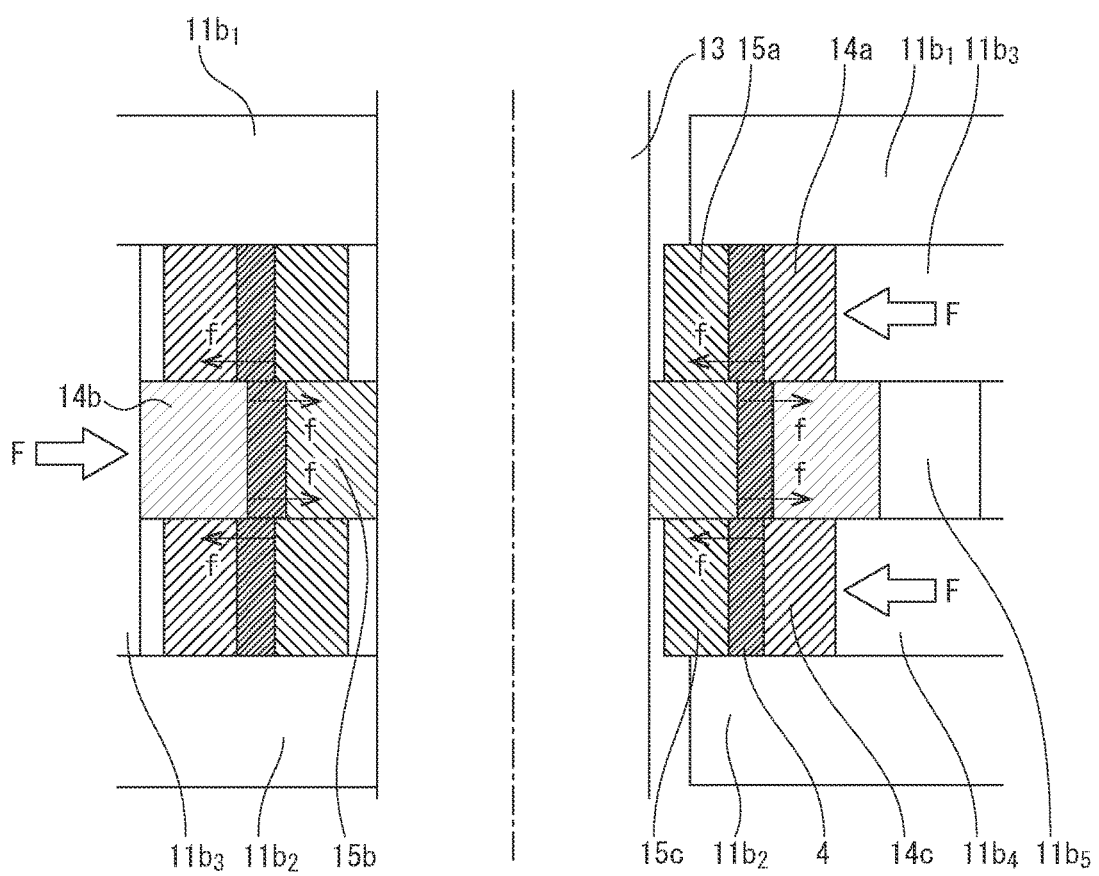
FIG. 5 is a principal portion enlarged view showing the machining state in the first embodiment of the method for manufacturing an annular member.

Then, as shown in FIG. 5, when the second roll 12 is moved on the installation axis A, and a distance between the rotation axis $11a$ and the rotation axis $12a$ is reduced, then such a force (shear force) f is applied to a portion 4B (portion that becomes the annular member 5B). Here, the shear force is a force that shifts the portion 4B, and the portion 4B is subjected to the abutment and the urging from the restraining molds $14b$ and $15b$ in the cylindrical member 4. Note that, in FIG. 5, "F" is a force applied to the restraining molds $14a$ and $14c$ from the mandrel 13.

In such a way, the cylindrical member 4 is co-rotated with the rotation of the second roll 12 in a state where the shear force f is applied thereto. That is to say, even if the cylindrical member 4 rotates, a state where such a shear force f and the force F applied to the restraining molds $14a$ and $14c$ are applied thereto without fail is maintained.

Figure 6A:
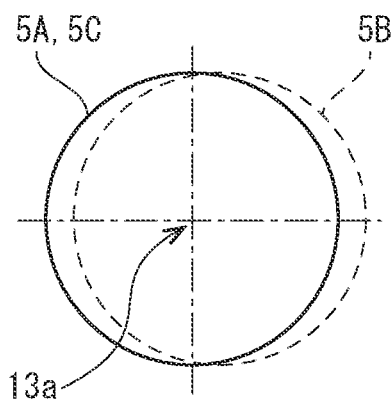
FIGS. 6A to 6C are conceptual views showing deformed states of a cylindrical member by rotation shear in the first embodiment of the method for manufacturing an annular member.
Figure 6B:
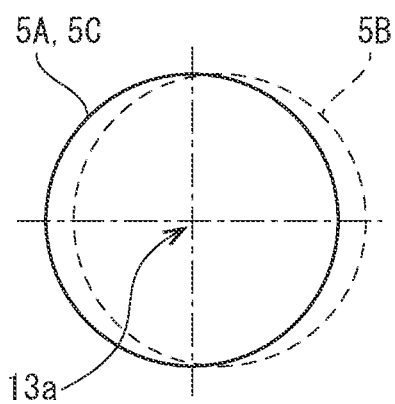
Figure 6C:
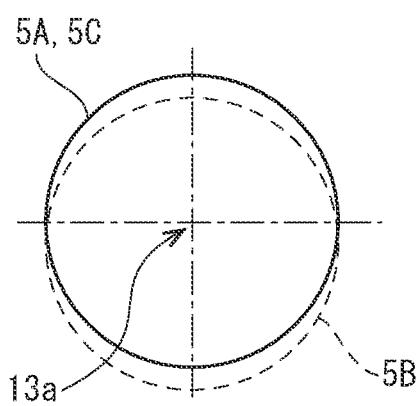

Then, the distance between the first roll 11 and the second roll 12 is varied, whereby it becomes possible to control the shear force that acts on the cylindrical member 4. Schematically speaking, this shear force that acts on the cylindrical member 4 moves as shown in FIGS. 6A to 6C and FIGS. 7A to 7D. As shown in FIG. 6A, the matter that the shape of the cylindrical member 4 when viewed from the side shows no change though the cylindrical member 4 rotates means that shear deformation is continuously repeated in rotating. That is to say, the following matter means that the shear deformation is applied to the cylindrical member 4 as the cylindrical member 4 is rotating. The matter in this case is that the cylindrical member 4 does not turn to such a state as shown in FIG. 6C even if the cylindrical member 4 rotates by 90° from a state thereof shown in FIG. 6A when viewed from above, but that as shown in FIG. 6B, a portion 4A that becomes an annular member 5A and a portion 4C that becomes an annular member 5C and the portion 4B that becomes the annular member 5B maintain the same attitude when viewed from above.

Figure 7A:
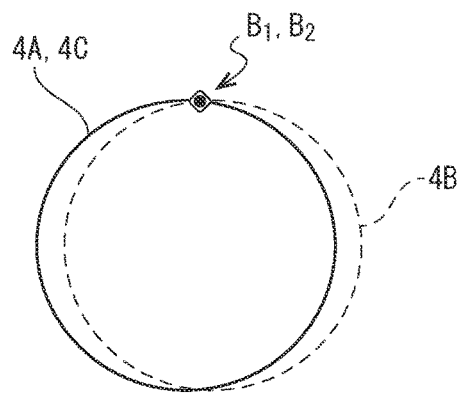
FIGS. 7A to 7D are conceptual views showing deformed states of the cylindrical member by the rotation shear in the first embodiment of the method for manufacturing an annular member.
Figure 7B:
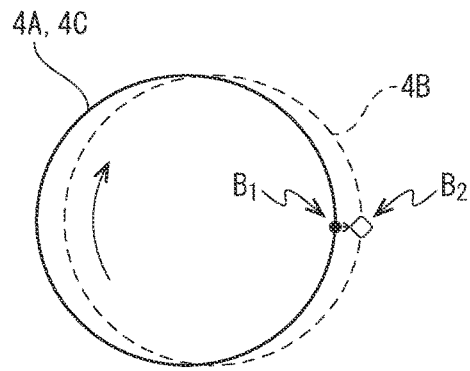
Figure 7C:
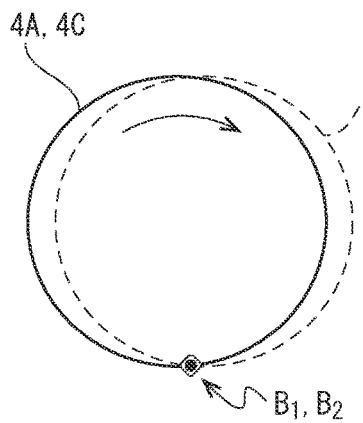
Figure 7D:
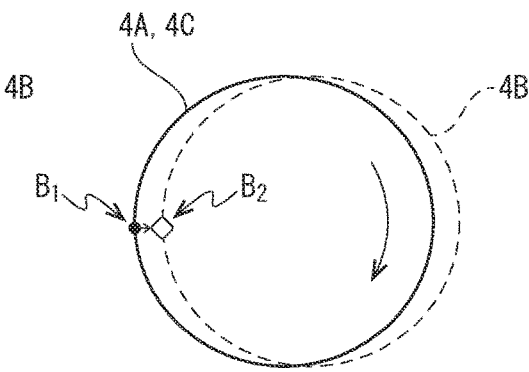

Specifically, as shown in FIG. 7A, the cylindrical member 4 rotates from a state where an arbitrary position B1 on the portion 4A that becomes the annular member 5A and on the portion 4C that becomes the annular member 5C and an arbitrary position B2 on the portion 4B that becomes the annular member 5B are located on the same axis, whereby the position B2 moves outward from a point of the position B1 as shown in FIG. 7B. Moreover, the cylindrical member 4 rotates from a state where the position B2 shown in FIG. 7B is located outward from the point of the position B1, whereby the position B1 and the position B2 are located on the same axis one more time as shown in FIG. 7C. Then furthermore, the cylindrical member 4 rotates from this state, whereby the point B2 moves inward from the point B1 as shown in FIG. 7D.

Hence, by continuing to rotate the first roll 11 and the second roll 12 (the cylindrical member 4 also continues to rotate), fatigue of the cylindrical member 4 is accelerated, the cylindrical member 4 is finally subjected to fatigue fracture to be thereby cut and separated, and the annular members 5A, 5B and 5C are obtained.

As described above, the method for manufacturing an annular member of this embodiment can provide the method for manufacturing the annular member with good yield and with high dimensional accuracy. Specifically, the cylindrical member 4 is cut and separated by applying the shear force thereto while rotating the same cylindrical member 4 in the state where the inner circumferential surface and outer circumferential surface of the cylindrical member 4 are restrained, whereby no scrap is generated in an event of the separation, and the yield is good. Moreover, the shear force is applied to the cylindrical member 4 while the cylindrical member 4 is being rotated in the state where the inner circumferential surface and outer circumferential surface of the cylindrical member 4 are restrained, and accordingly, the cylindrical member 4 is cut by using the fatigue fracture and by repeating application of a small force, and accordingly, a dimensional change can also be reduced.

In particular, in this embodiment, the same force is repeatedly applied to an entire circumference of a part (for example, a partial region shown by reference numeral 4B) of the cylindrical member 4 in a state where the inner circumferential surface and outer circumferential surface of the cylindrical member 4 are restrained by the restraining molds. This applied force is a fairly weak force in comparison with that in a case of cutting the cylindrical member 4 by shear cutting performed once. Hence, a phenomenon that the cylindrical member 4 as the object to be cut becomes ellipsoidal and a phenomenon that the cylindrical member 4 is deformed largely in one direction can be made as small as possible.

Moreover, the method in this embodiment is a method of obtaining the annular members 5 by using the fatigue fracture of the cylindrical member 4, and accordingly, the cylindrical member 4 can be cut without generating the scrap.

Furthermore, a plurality of the annular members can obtained from the cylindrical member 4 which is not still subjected to the rotation shear, and accordingly, the number of steps for fabricating the cylindrical member 4 can be reduced. Moreover, in a case of obtaining three annular members 5 by dividing the cylindrical member 4 into three, only a single punched scrap is generated with respect to three pieces of the annular members, and accordingly, good yield is achieved.

Modification Example of First Embodiment

Figure 8:
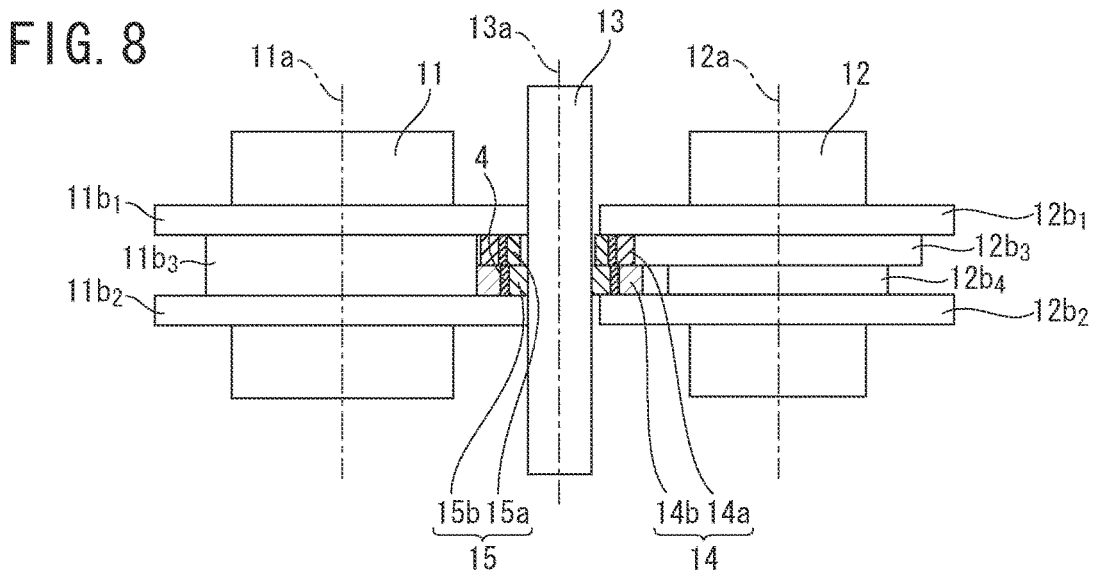
FIG. 8 is a side surface portion cross-sectional view showing a configuration of a machining device in a modification example of the first embodiment of the method for manufacturing an annular member.

FIG. 8 is a cross-sectional view showing an outline of machining of an annular member in a modification example of the first embodiment of the method for manufacturing an annular member.

As shown in FIG. 8, in the cutting and separating step, the modification example of the first embodiment is not a mode of dividing the cylindrical member 4 into three in the axial direction thereof as in the first embodiment, but is a mode of dividing the cylindrical member 4 into two in the axial direction thereof.

[Overall Configuration]

As shown in FIG. 8, in a cutting and separating device 10 of this modification example, the first roll 11, the mandrel 13 and the second roll 12 have predetermined intervals therebetween so that the respective rotation axes 11a, 13a and 12a can be arrayed side by side on the installation axis A (refer to FIG. 2), and are provided in this order so as to be individually rotatable actively, or to be individually rotatable passively. Here, it is defined that at least either one of the first roll 11 and the second roll 12 has a drive source of the rotation. Moreover, at least either one of the first roll 11 and the second roll 12 is installed so that at least either one of the rotation axis 11a of the first roll 11 and the rotation axis 12a of the second roll 12 can be capable of making the translational motion on the installation axis A.

The description is made of this modification example on the assumption that each of the first roll 11 and the second roll 12 has a drive source exclusive thereto and is made actively rotatable, and that the mandrel 13 is installed so as to abut against the first roll 11 and to be made passively rotatable. Moreover, the description is made of this embodiment on the assumption that only the second roll 12 is installed so that the rotation axis 12a thereof can be capable of making the translational motion on the installation axis A, and on the assumption that the rotation axis 11a of the first roll 11 and the rotation axis 13a of the mandrel 13 are fixed.

[Restraining Mold]

Moreover, on an outer circumferential surface side of the cylindrical member 4, the restraining molds 14 which restrain the outer circumferential surface of the cylindrical member 4 as an object to be machined (that is, a work) are provided while individually forming an annular shape. With regard to these restraining molds 14, in a case of dividing the cylindrical member 4 into two in the axial direction thereof as in this modification example, restraining molds 14a and 14b are provided while thicknesses thereof are being differentiated from each other in the radial direction.

Moreover, on an inner circumferential surface side of the cylindrical member 4, as shown in FIG. 8, the restraining molds 15 which restrain the inner circumferential surface of the cylindrical member 4 are provided while individually forming an annular shape. In a similar way to the restraining molds 14, these restraining molds 15 are made of a plurality of such restraining molds 15, the number of which is determined based on how many pieces the cylindrical member 4 is to be divided into in the axial direction. For example, the restraining molds 15a and 15b are provided so as to abut against the inner circumferential surface of the cylindrical member 4 at heights in the axial direction, which individually correspond to the restraining molds 14a and 14b.

Moreover, not only the restraining molds 15a and 15b are provided while differentiating widths thereof in the radial direction from each other, but also, preferably, one thereof (for example, the restraining mold 15b) is fitted to the mandrel 13.

[Restricting Portions and Urging Portions]

Moreover, in the first roll 11 fixed on the installation axis A, disc-shaped restricting portions $11b_1$ and $11b_2$, which fix the cylindrical member 4, and a columnar urging portion $11b_3$, which applies the urging force to the restraining molds 14a and 14b, are provided coaxially with the first roll 11. The restricting portion $11b_1$ is provided so as to abut against the upper end surface of the cylindrical member 4 and to restrict the upward motion of the cylindrical member 4.

Moreover, the restricting portion $11b_2$ is provided so as to abut against the lower end surface of the cylindrical member 4 and to restrict the downward motion of the cylindrical member 4. Furthermore, the urging portion $11b_3$ is provided between the restricting portion $11b_1$ and the restricting portion $11b_2$, and is provided so as to apply the urging force to the restraining mold 14b. Here, the diameter of each of the restricting portions $11b_1$ and $11b_2$ is set larger than the diameter of the urging portion $11b_3$.

Moreover, in the second roll 12 made movable along the installation axis A, disc-shaped restricting portions $12b_1$ and $12b_2$, which fix the cylindrical member 4, and disc-shaped urging portions $12b_3$ and $12b_4$, which apply the urging force to the restraining molds 14a and 14b, are provided coaxially with the second roll 12. The restricting portion $12b_1$ is provided so as to abut against the upper end surface of the cylindrical member 4 and to restrict the upward motion of the cylindrical member 4. Moreover, the restricting portion $12b_2$ is provided so as to abut against the lower end surface of the cylindrical member 4 and to restrict the downward motion of the cylindrical member 4.

Moreover, the urging portion $12b_3$ is provided so as to apply the urging force to the restraining mold 14a. Moreover, the urging portion $12b_4$ is provided so as to apply the urging force to the restraining mold 14b. Here, the diameter of each of the restricting portions $12b_1$ and $12b_2$ is set larger than diameters of the urging portions $12b_3$ and $12b_4$. Note that, as such a configuration of dividing the cylindrical member 4 into two, the urging portion 12 is composed of the urging portions $12b_3$ and $12b_4$, and in addition, the restraining mold 14 is composed of two restraining molds 14a and 14b, whereby a moment to tilt the mandrel 13 is applied; however, by fabricating the cutting and separating device 10 so that the cutting and separating device 10 can endure the moment, it is possible to separate the cylindrical member 4 without tilting the mandrel 13.

Second Embodiment

FIGS. 9A to 9F are cross-sectional views showing an outline of machining of an annular member in a second embodiment of the method for manufacturing an annular member.

The method for manufacturing an annular member of this embodiment includes the cylindrical member forming step, a notch forming step and a cutting and separating step. This embodiment has special technical features in the notch forming step and the cutting and separating step. Hence, the description of this embodiment is made by using FIGS. 9A to 9F, and in addition, FIGS. 2A and 2B to FIGS. 7A to 7D, which are common to the above-mentioned first embodiment.

<Cylindrical Member Forming Step>

The cylindrical member forming step is a step of forming a cylindrical member with an annular shape from a round bar material.

Figures 9A, 9B, 9C, 9D, 9E, 9F:
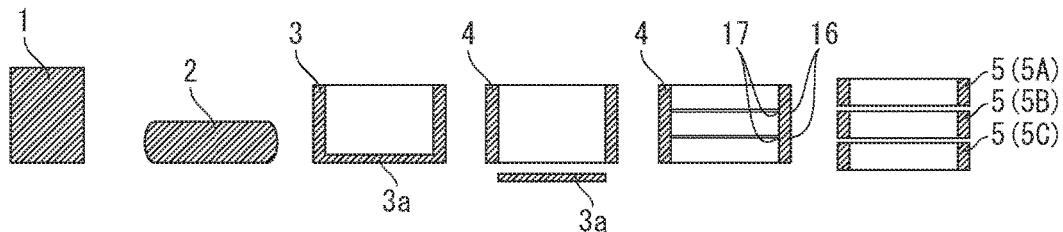
FIGS. 9A to 9F are cross-sectional views showing an outline of machining of an annular member in a second embodiment of the method for manufacturing an annular member.

First, by using a round bar member 1 shown in FIG. 9A, a cut billet 2 shown in FIG. 9B is made by any method of press cutting, saw cutting and cutting-off. At this time, in a case where the cut billet 2 is cut out by the press cutting, surface roughness of a cutting section thereof is not acceptable, and accordingly, a crack is prone to occur therein, and a perpendicularity of the cutting section to an axial direction thereof is poor. Therefore, the upsetting or the end surface correction is performed for the cut billet 2. Note that, in a case where the cut billet 2 is obtained by the saw cutting or the cutting-off, the roughness of the cutting section is acceptable, and a perpendicularity of the cutting section with respect to a billet axis direction is good, and accordingly, the upsetting and the end surface correction do not have to be performed.

Next, as shown in FIG. 9C, the cut billet 2 is subjected to backward extrusion, whereby a backward extrusion billet 3, which forms a top-opened and bottomed cylindrical shape, is molded. In this backward extrusion, a load and a surface pressure, which are applied to the backward extrusion billet 3, are high, and accordingly, the molding is performed with a reduced load and a low surface pressure while decreasing the deformation resistance.

Next, as shown in FIG. 9D, a bottom portion 3a of the backward extrusion billet 3 is penetrated, and a cylindrical member (pipe-like member) 4 is formed.

<Notch Forming Step>

Figures 10A, 10B:
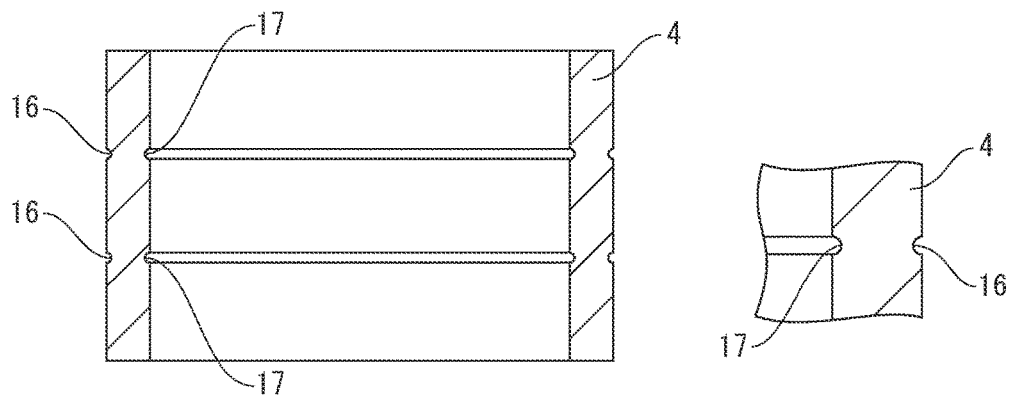
FIGS. 10A and 10B are views showing notches formed in the second embodiment.

Next, as shown in FIG. 9E, notches 16 and 17 are formed on such an inner diameter surface and outer diameter surface of the cylindrical member 4. As shown in FIGS. 10A and 10B, the notches 16 and 17 are groove-like dents formed over entire circumference of spots where the cylindrical member 4 is cut, and are formed by cutting machining, plastic machining such as rolling machining, and the like. It is desirable that the notches 16 and 17 have a shape to which a stress concentration occurs in an event where the shear force is applied in the cutting and separating step to be described later. For example, in this embodiment, bottom portions of the notches 16 and 17 are formed into a U-shape as shown in FIG. 10B.

Figures 11A, 11B:
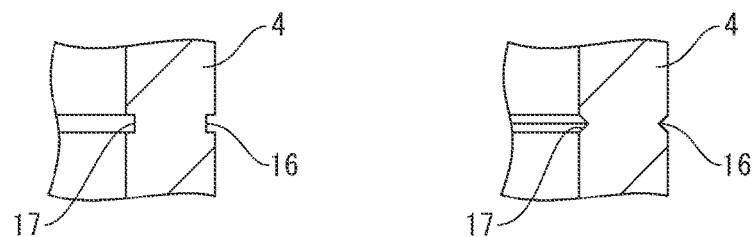
FIGS. 11A and 11B are views showing an example of a cross-sectional shape of the notches.

Note that the shape of the bottom portions of the notches only needs to be such a shape to which the stress concentration is likely to occur, and for example, may be a rectangular shape as shown in FIG. 11A, or a V-shape as shown in FIG. 11B.

Moreover, it is desirable that, as in this embodiment, the notches 16 and 17 be formed on both of the inner diameter surface and outer diameter surface of the cylindrical member 4; however, the notches 16 and 17 may be formed on only either one of the inner diameter surface and the outer diameter surface.

<Cutting and Separating Step>

The cutting and separating step is a step of cutting the cylindrical member 4 over an axial direction thereof and obtaining a plurality of annular members (ring-like members) 5 as shown in FIG. 9F. Specifically, the cutting and separating step is a step of rotating the cylindrical member 4, and cutting and separating the cylindrical member 4 over the axial direction of the cylindrical member 4 by a shear force obtained by restraining molds, which apply an urging force to an outer circumferential surface of the cylindrical member 4, and by a restraining mold, which is provided with a gap on the outer circumferential surface, among restraining molds provided in plural on an inner circumferential surface side and outer circumferential surface side of the cylindrical member 4 along the axial direction, and thereby obtaining a plurality of annular members 5A, 5B and 5C.

This cutting and separating step is implemented by using a cutting and separating device 10 shown in FIGS. 2A and 2B and FIG. 3. The cutting and separating device 10 includes a first roll 11, a second roll 12 and a mandrel 13. In the following description, a mode of dividing the cylindrical member 4 as an object to be machined (that is, a work) into three in the axial direction thereof is described.

[Overall Configuration]

The first roll 11, the mandrel 13 and the second roll 12 have predetermined intervals therebetween so that respective rotation axes 11a, 13a and 12a can be arrayed side by side on an installation axis A, and are provided in this order so as to be individually rotatable actively, or to be individually rotatable passively. Here, it is defined that at least either one of the first roll 11 and the second roll 12 has a drive source of rotation. Moreover, at least either one of the first roll 11 and the second roll 12 is installed so that at least either one of the rotation axis 11a of the first roll 11 and the rotation axis 12a of the second roll 12 can be capable of making a translational motion on the installation axis A.

The description is made of this embodiment on the assumption that each of the first roll 11 and the second roll 12 has a drive source exclusive thereto and is made actively rotatable, and that the mandrel 13 is installed so as to abut against the first roll 11 and to be made passively rotatable. Moreover, the description is made of this embodiment on the assumption that only the second roll 12 is installed so that the rotation axis 12a thereof can be capable of making the translational motion on the installation axis A, and on the assumption that the rotation axis 11a of the first roll 11 and the rotation axis 13a of the mandrel 13 are fixed.

[Restraining Mold]

Moreover, on the outer circumferential surface side of the cylindrical member 4, the restraining molds 14 which restrain the outer circumferential surface of the cylindrical member 4 as the object to be machined (that is, the work) are provided while individually forming an annular shape. These restraining molds 14 are made of a plurality of such restraining molds 14, the number of which is determined based on how many pieces the cylindrical member 4 is to be divided into in the axial direction. For example, in a case of dividing the cylindrical member 4 into three in the axial direction as shown in FIG. 2B and FIG. 3, restraining molds 14a, 14b and 14c are provided while thicknesses thereof are being differentiated from one another in a radial direction.

Moreover, on the inner circumferential surface side of the cylindrical member 4, as shown in FIG. 2B and FIG. 3, the restraining molds 15 which restrain the inner circumferential surface of the cylindrical member 4 are provided while individually forming an annular shape. In a similar way to the restraining molds 14, these restraining molds 15 are made of a plurality of such restraining molds 15, the number of which is determined based on how many pieces the cylindrical member 4 is to be divided into in the axial direction. For example, the restraining molds 15a, 15b and 15c are provided so as to abut against the inner circumferential surface of the cylindrical member 4 at heights in the axial direction, which individually correspond to the restraining molds 14a, 14b and 14c.

Moreover, not only the restraining molds 15a, 15b and 15c are provided while differentiating widths thereof in the radial direction from one another, but also, preferably, one thereof (for example, the restraining mold 15b) is fitted to the mandrel 13.

[Restricting Portions and Urging Portion]

Moreover, in the first roll 11 fixed on the installation axis A, disc-shaped restricting portions $11b_1$ and $11b_2$, which fix the cylindrical member 4, and a columnar urging portion $11b_3$, which urges the restraining molds 14a, 14b and 14c, are provided coaxially with the first roll 11. The restricting portion $11b_1$ is provided so as to abut against an upper end surface of the cylindrical member 4 and to restrict an upward motion of the cylindrical member 4.

Moreover, the restricting portion $11b_2$ is provided so as to abut against a lower end surface of the cylindrical member 4 and to restrict a downward motion of the cylindrical member 4. Furthermore, the urging portion $11b_3$ is provided between the restricting portion $11b_1$ and the restricting portion $11b_2$, and is provided so as to apply the urging force to the restraining mold 14b. Here, a diameter of each of the restricting portions $11b_1$ and $11b_2$ is set larger than a diameter of the urging portion $11b_3$.

Moreover, in the second roll 12 made movable along the installation axis A, disc-shaped restricting portions $12b_1$ and $12b_2$, which fix the cylindrical member 4, and disc-shaped urging portions $12b_1$ to $12b_4$, which urge the restraining molds 14a and 14c, are provided coaxially with the second roll 12. The restricting portion $12b_1$ is provided so as to abut against the upper end surface of the cylindrical member 4 and to restrict the upward motion of the cylindrical member 4. Moreover, the restricting portion $12b_2$ is provided so as to abut against the lower end surface of the cylindrical member 4 and to restrict the downward motion of the cylindrical member 4.

Moreover, the urging portion $12b_3$ is provided so as to apply the urging force to the restraining mold 14a. Moreover, the urging portion $12b_4$ is provided so as to apply the urging force to the restraining mold 14c. Moreover, between the urging portion $12b_3$ and the urging portion $12b_4$, a cushioning portion $12b_5$ is provided with a predetermined gap from the restraining mold 14b. Here, a diameter of the restricting portions $12b_1$ and $12b_2$ is set larger than diameters of the urging portions $12b_3$ and $12b_4$, and the diameters of the urging portions $12b_3$ and $12b_4$ are set larger than a diameter of the cushioning portion $12b_5$.

Here, in the cylindrical member 4 in this embodiment, as shown in FIG. 3, the inner circumferential surface and outer circumferential surface thereof are restrained by the restraining molds 14 and 15, which make pairs the number of which is equivalent to the number of annular members (ring-like members) 5 desired to be finally obtained. However, in a case where deformation of the cylindrical member 4 can be suppressed sufficiently, then as shown in FIG. 4, an annular protruding portion 13b having a similar function to that of the restraining mold 15b may be provided on the mandrel 13.

Next, a specific description is made of the cutting and separating step performed by the cutting and separating device 10 shown in FIGS. 2A and 2B and FIG. 3.

First, as shown in FIG. 3, the cylindrical member 4 as the object to be machined is installed so that the mandrel 13 can be inserted through the inner circumferential surface side thereof, and the restraining molds 15a, 15b and 15c are installed between the cylindrical member 4 and the mandrel 13. In this event, the restraining mold 15b is installed so that the mandrel 13 can be fitted to the inner circumferential surface thereof, and that the outer circumferential surface thereof can be fitted to the inner circumferential surface of the cylindrical member 4.

Next, as shown in FIG. 3, the restraining molds 14a, 14b and 14c are installed on the outer circumferential surface side of the cylindrical member 4. In this event, the restraining mold 14b is provided so that the inner circumferential surface thereof can abut against the outer circumferential surface of the cylindrical member 4, and in addition, that the outer circumferential surface thereof can abut against an outer circumferential surface of the urging portion $11b_3$ of the first roll 11. Note that a reason why the restraining mold 14b among the restraining molds 14a, 14b and 14c is allowed to abut against the cylindrical member 4 and the urging portion $11b_3$ is that, in the second roll 12, the cushioning portion $12b_5$ is provided with the predetermined gap from the restraining mold 14b.

The cylindrical member 4 installed as described above rotates together with the mandrel 13 following the rotation of the first roll 11 (a direction of the rotation is illustrated in FIG. 2A), and allows the second roll 12, which rotates in a similar way, to make the translational motion along the installation axis A.

Then, as shown in FIG. 5, when the second roll 12 is moved on the installation axis A, and a distance between the rotation axis 11a and the rotation axis 12a is reduced, then such a force (shear force) f is applied to a portion 4B (portion that becomes the annular member 5B). Here, the shear force is a force that shifts the portion 4B, and the portion 4B is subjected to the abutment and the urging from the restraining molds 14b and 15b in the cylindrical member 4. Note that, in FIG. 5, "F" is a force applied to the restraining molds 14a and 14c from the mandrel 13.

In such a way, the cylindrical member 4 is co-rotated with the rotation of the second roll 12 in a state where the shear force f is applied thereto. That is to say, even if the cylindrical member 4 rotates, a state where such a shear force f and the force F applied to the restraining molds 14a and 14c are applied thereto without fail is maintained.

Then, the distance between the first roll 11 and the second roll 12 is varied, whereby it becomes possible to control the shear force that acts on the cylindrical member 4. Schematically speaking, this shear force that acts on the cylindrical member 4 moves as shown in FIGS. 6A to 6C and FIGS. 7A to 7D. As shown in FIG. 6A, the matter that the shape of the cylindrical member 4 when viewed from the side shows no change though the cylindrical member 4 rotates means that the cylindrical member 4 continuously repeats shear deformation in rotating. That is to say, the following matter means that the shear deformation is applied to the cylindrical member 4 as the cylindrical member 4 is rotating. The matter in this case is that the cylindrical member 4 does not turn to such a state as shown in FIG. 6C even if the cylindrical member 4 rotates by 90° from a state thereof shown in FIG. 6A when viewed from above, but that as shown in FIG. 6B, a portion 4A that becomes an annular member 5A and a portion 4C that becomes an annular member 5C and the portion 4B that becomes the annular member 5B maintain the same attitude when viewed from above.

Specifically, as shown in FIG. 7A, the cylindrical member 4 rotates from a state where an arbitrary position B1 on the portion 4A that becomes the annular member 5A and on the portion 4C that becomes the annular member 5C and an arbitrary position B2 on the portion 4B that becomes the annular member 5B are located on the same axis, whereby the position B2 moves outward from a point of the position B1 as shown in FIG. 7B. Moreover, the cylindrical member 4 rotates from a state where the position B2 shown in FIG. 7B is located outward from the point of the position B1, whereby the position B1 and the position B2 are located on the same axis one more time as shown in FIG. 7C. Then furthermore, the cylindrical member 4 rotates from this state, whereby the point B2 moves inward from the point B1 as shown in FIG. 7D.

Hence, by continuing to rotate the first roll 11 and the second roll 12 (the cylindrical member 4 also continues to rotate), fatigue of the cylindrical member 4 is accelerated, the cylindrical member 4 is finally subjected to the fatigue fracture to be thereby cut and separated, and the annular members 5A, 5B and 5C are obtained.

As described above, the method for manufacturing an annular member of this embodiment can provide the method for manufacturing the annular member with good yield and with high dimensional accuracy. Specifically, the cylindrical member 4 is cut and separated by applying the shear force thereto while rotating the same cylindrical member 4 in the state where the inner circumferential surface and outer circumferential surface of the cylindrical member 4 are restrained, whereby no scrap is generated in an event of the separation, and the yield is good. Moreover, the shear force is applied to the cylindrical member 4 while the cylindrical member 4 is being rotated in the state where the inner circumferential surface and outer circumferential surface of the cylindrical member 4 are restrained, and accordingly, the cylindrical member 4 is cut by using the fatigue fracture and by repeating application of a small force, and accordingly, a dimensional change can also be reduced.

In particular, in this embodiment, the same force is repeatedly applied to an entire circumference of a part (for example, a partial region shown by reference numeral 4B) of the cylindrical member 4 in a state where the inner circumferential surface and outer circumferential surface of the cylindrical member 4 are restrained by the restraining molds. This applied force is a fairly weak force in comparison with that in a case of cutting the cylindrical member 4 by shear cutting performed once. Hence, a phenomenon that the cylindrical member 4 as the object to be cut becomes ellipsoidal and a phenomenon that the cylindrical member 4 is deformed largely in one direction can be made as small as possible.

Moreover, the method in this embodiment is a method of obtaining the annular members 5 by using the fatigue fracture of the cylindrical member 4, and accordingly, the cylindrical member 4 can be cut without generating the scrap.

Furthermore, a plurality of the annular members can obtained from the cylindrical member 4 which is not still subjected to the rotation shear, and accordingly, the number of steps for fabricating the cylindrical member 4 can be reduced. Moreover, in a case of obtaining three annular members 5 by dividing the cylindrical member 4 into three, only a single punched scrap is generated with respect to three pieces of the annular members, and accordingly, good yield is achieved.

Moreover, such notch portions 16 and 17 are provided on the cylindrical member 4, whereby the stress concentration occurs in the notches 16 and 17 at the time of the rotation shear, the cutting and the separation can be performed with a lower load, a shape of such cross sections of the cut annular members 5 becomes smooth, and the shape of the annular members 5 is stabilized. In addition, the deformation of the work can be suppressed to be smaller, and the dimensional accuracy is improved.

Moreover, the cutting and the separation can be performed in a short time, and an effect that a machining time can be shortened is exerted.

That is to say, the notches are provided on at least either one of the inner circumferential surface and outer circumferential surface of the cylindrical member, whereby cracks for the cutting and the separation are generated with a lower load than in the prior art, and accordingly, the annular member can be obtained in a shorter time and at low cost than those of the prior art.

Third Embodiment

Next, a description is made of a third embodiment of the method for manufacturing an annular member with reference to the drawings. Note that this embodiment is different from the first embodiment only in that a rolling step is added, and accordingly, a description of constituents, which are similar to those of the above-mentioned embodiment and are denoted by the same reference numerals as those thereof, is sometimes omitted. FIGS. 12A to 12F are cross-sectional views showing an outline of machining of the annular member in the third embodiment of the method for manufacturing an annular member.

As shown in FIGS. 12A to 12F, this embodiment includes the rolling step (FIG. 12E) before the cutting and separating step. First, by using a round bar member 1 shown in FIG. 12A, a cut billet 2 shown in FIG. 12B is made by any method of press cutting, saw cutting and cutting-off. At this time, in a case where the cut billet 2 is cut out by the press cutting, surface roughness of a cutting section thereof is not acceptable, and accordingly, a crack is prone to occur therein, and a perpendicularity of the cutting section to an axial direction thereof is poor. Therefore, the upsetting or end surface correction is performed for the cut billet 2. Note that, in a case where the cut billet 2 is obtained by the saw cutting or the cutting-off, the roughness of the cutting section is acceptable, and a perpendicularity of the cutting section with respect to a billet axis direction is good, and accordingly, the upsetting and the end surface correction do not have to be performed.

Next, as shown in FIG. 12C, the cut billet 2 is subjected to backward extrusion, whereby a backward extrusion billet 3, which forms a top-opened and bottomed cylindrical shape, is molded.

Next, as shown in FIG. 12D, a bottom portion 3a of the backward extrusion billet 3 is penetrated, and a cylindrical member (pipe-like member) 4 is formed.

Next, as shown in FIG. 12E, as the rolling step, the cylindrical member (pipe-like member) 4, in which the bottom portion 3a is penetrated, is rolled and expanded in diameter. Note that this rolling step may be of either of a cold one and a hot one. This rolling step is performed before the cutting and separating step, that is, in the last of the cylindrical member forming step, whereby punching residues in the penetration of the bottom portion 3a shown in FIG. 12D can be further reduced, and the yield is enhanced.

Next, in a similar way to the above-mentioned cutting and separating step, as shown in FIG. 12F, the cylindrical member 4 is cut over an axial direction thereof, and a plurality of annular members (ring-like members) 5 are fabricated.

Fourth Embodiment

Next, a description is made of a fourth embodiment of the method for manufacturing an annular member with reference to the drawings. Note that this embodiment is different from the second embodiment only in that a rolling step is added, and accordingly, a description of constituents, which are similar to those of the above-mentioned embodiment and are denoted by the same reference numerals as those thereof, is sometimes omitted. FIGS. 13A to 13F are cross-sectional views showing an outline of machining of an annular member in the fourth embodiment of the method for manufacturing an annular member.

As shown in FIGS. 13A to 13F, this embodiment includes the rolling step (FIG. 13E) before the cutting and separating step. First, by using a round bar member 1 shown in FIG. 13A, a cut billet 2 shown in FIG. 13B is made by any method of press cutting, saw cutting and cutting-off. At this time, in a case where the cut billet 2 is cut out by the press cutting, surface roughness of a cutting section thereof is not acceptable, and accordingly, a crack is prone to occur therein, and a perpendicularity of the cutting section to an axial direction thereof is poor. Therefore, upsetting or end surface correction is performed for the cut billet 2. Note that, in a case where the cut billet 2 is obtained by the saw cutting or the cutting-off, the roughness of the cutting section is acceptable, and a perpendicularity of the cutting section with respect to a billet axis direction is good, and accordingly, the upsetting and the end surface correction do not have to be performed.

Next, as shown in FIG. 13C, the cut billet 2 is subjected to backward extrusion, whereby a backward extrusion billet 3, which forms a top-opened and bottomed cylindrical shape, is molded.

Next, as shown in FIG. 13D, a bottom portion 3a of the backward extrusion billet 3 is penetrated, and a cylindrical member (pipe-like member) 4 is formed.

Next, as shown in FIG. 13E, as the rolling step, the cylindrical member (pipe-like member) 4, in which the bottom portion 3a is penetrated, is rolled and expanded in diameter, and in addition, notches 16 and 17 are formed. Note that this rolling step may be of either of a cold one and a hot one. This rolling step is performed before the cutting and separating step, that is, in the last of the cylindrical member forming step, whereby punching residues in the penetration of the bottom portion 3a shown in FIG. 13D can be further reduced, and the yield is enhanced.

Next, in a similar way to the above-mentioned cutting and separating step, as shown in FIG. 13F, the cylindrical member 4 is cut over an axial direction thereof, and a plurality of annular members (ring-like members) 5 are fabricated.

Fifth Embodiment

Next, a description is made of a fifth embodiment of the method for manufacturing an annular member with reference to the drawings. Note that this embodiment is different from the third embodiment only in that a groove forming step is added, and accordingly, a description of constituents, which are similar to those of the above-mentioned embodiment and are denoted by the same reference numerals as those thereof, is sometimes omitted. FIGS. 14A to 14F are cross-sectional views showing an outline of machining of an annular member in the fifth embodiment of the method for manufacturing an annular member.

As shown in FIGS. 14A to 14F, in this embodiment, the groove forming step is performed in an event of a rolling step (FIG. 14E). First, by using a round bar member 1 shown in FIG. 14A, a cut billet 2 shown in FIG. 14B is made by any method of press cutting, saw cutting and cutting-off. At this time, in a case where the cut billet 2 is cut out by the press cutting, surface roughness of a cutting section thereof is not acceptable, and accordingly, a crack is prone to occur therein, and a perpendicularity of the cutting section to an axial direction thereof is poor. Therefore, upsetting or end surface correction is performed for the cut billet 2. Note that, in a case where the cut billet 2 is obtained by the saw cutting or the cutting-off, the roughness of the cutting section is acceptable, and perpendicularity of the cutting section with respect to a billet axis direction is good, and accordingly, the upsetting and the end surface correction do not have to be performed.

Next, as shown in FIG. 14C, the cut billet 2 is subjected to backward extrusion, whereby a backward extrusion billet 3, which forms a top-opened and bottomed cylindrical shape, is molded.

Next, as shown in FIG. 14D, a bottom portion 3a of the backward extrusion billet 3 is penetrated, and a cylindrical member (pipe-like member) 4 is formed.

Next, as shown in FIG. 14E, as the rolling step, the cylindrical member 4, in which the bottom portion 3a is penetrated, is rolled and expanded in diameter, and in addition, as the groove forming step, grooves 6, which form an annular shape along the inner circumferential surface of the cylindrical member 4, are formed on the same inner circumferential surface. These grooves 6 are rolling grooves in an event where the cylindrical member 4 is applied, for example, as an outer ring of a ball bearing. Note that these rolling step and groove forming step may be of either of cold ones and hot ones. As described above, the grooves 6 can be formed on a large number (here, three) of the annular members 5 by the single rolling molding, and accordingly, there is an effect that a subsequent cutting margin can be reduced, and the number of steps is small.

Next, in a similar way to the above-mentioned cutting and separating step, as shown in FIG. 14F, the cylindrical member 4 is cut over an axial direction thereof, and a plurality of annular members (ring-like members) 5 are fabricated.

Rotation shear that acts on the cylindrical member 4 in this embodiment exhibits a mode shown in FIG. 16 (corresponding to FIG. 3 in the first embodiment); however, portions other than the grooves 6 in the cylindrical member 4 can be urged by the restraining molds 14 and 15, and accordingly, it is possible to perform the cutting and the separation without any problem also in this embodiment.

Sixth Embodiment

Next, a description is made of a sixth embodiment of the method for manufacturing an annular member with reference to the drawings. Note that this embodiment is different from the fourth embodiment only in that a groove forming step is added, and accordingly, a description of constituents, which are similar to those of the above-mentioned embodiment and are denoted by the same reference numerals as those thereof, is sometimes omitted. FIGS. 15A to 15F are cross-sectional views showing an outline of machining of an annular member in the sixth embodiment of the method for manufacturing an annular member.

As shown in FIGS. 15A to 15F, in this embodiment, the groove forming step is performed in an event of a rolling step (FIG. 15E). First, by using a round bar member 1 shown in FIG. 15A, a cut billet 2 shown in FIG. 15B is made by any method of press cutting, saw cutting and cutting-off. At this time, in a case where the cut billet 2 is cut out by the press cutting, surface roughness of a cutting section thereof is not acceptable, and accordingly, a crack is prone to occur therein, and a perpendicularity of the cutting section to an axial direction thereof is poor. Therefore, upsetting or end surface correction is performed for the cut billet 2. Note that, in a case where the cut billet 2 is obtained by the saw cutting or the cutting-off, the roughness of the cutting section is acceptable, and a perpendicularity of the cutting section with respect to a billet axis direction is good, and accordingly, the upsetting and the end surface correction do not have to be performed.

Next, as shown in FIG. 15C, the cut billet 2 is subjected to backward extrusion, whereby a backward extrusion billet 3, which forms a top-opened and bottomed cylindrical shape, is molded.

Next, as shown in FIG. 15D, a bottom portion 3a of the backward extrusion billet 3 is penetrated, and a cylindrical member (pipe-like member) 4 is formed.

Next, as shown in FIG. 15E, as the rolling step, the cylindrical member 4, in which the bottom portion 3a is penetrated, is rolled and expanded in diameter, and in addition, notches 16 and 17 are formed. Moreover, as the groove forming step, grooves 6, which form an annular shape along the inner circumferential surface of the cylindrical member 4, are formed on the same inner circumferential surface.

These grooves 6 are rolling grooves in an event where the cylindrical member 4 is applied, for example, as an outer ring of a ball bearing. Note that these rolling step and groove forming step may be of either of cold ones and hot ones. As described above, the grooves 6 can be formed on a large number (here, three) of the annular members 5 by the single rolling molding, and accordingly, there is an effect that a subsequent cutting margin can be reduced, and the number of steps is small.

Next, in a similar way to the above-mentioned cutting and separating step, as shown in FIG. 15F, the cylindrical member 4 is cut over an axial direction thereof, and a plurality of annular members (ring-like members) 5 are fabricated.

Rotation shear that acts on the cylindrical member 4 in this embodiment exhibits a mode shown in FIG. 16 (corresponding to FIG. 3 in the first embodiment); however, portions other than the grooves 6 in the cylindrical member 4 can be urged by the restraining molds 14 and 15, and accordingly, it is possible to perform the cutting and the separation without any problem also in this embodiment.

Seventh Embodiment

Next, a description is made of a seventh embodiment of the method for manufacturing an annular member with reference to the drawings. Note that this embodiment is different from the fifth embodiment only in the groove forming step, and accordingly, a description of constituents, which are similar to those of the above-mentioned embodiment and are denoted by the same reference numerals as those thereof, is sometimes omitted. FIGS. 17A to 17F are cross-sectional views showing an outline of machining of an annular member in the seventh embodiment of the method for manufacturing an annular member. Moreover, FIG. 18 is a principal portion enlarged view showing a machining state in the seventh embodiment of the method for manufacturing an annular member.

As shown in FIGS. 17A to 17F, in this embodiment, the groove forming step is performed in an event of a rolling step (FIG. 17E). First, by using a round bar member 1 shown in FIG. 17A, a cut billet 2 shown in FIG. 17B is made by any method of press cutting, saw cutting and cutting-off. At this time, in a case where the cut billet 2 is cut out by the press cutting, surface roughness of a cutting section thereof is not acceptable, and accordingly, a crack is prone to occur therein, and a perpendicularity of the cutting section to an axial direction thereof is poor. Therefore, upsetting or end surface correction is performed for the cut billet 2. Note that, in a case where the cut billet 2 is obtained by the saw cutting or the cutting-off, the roughness of the cutting section is acceptable, and a perpendicularity of the cutting section with respect to a billet axis direction is good, and accordingly, the upsetting and the end surface correction do not have to be performed.

Next, as shown in FIG. 17C, the cut billet 2 is subjected to backward extrusion, whereby a backward extrusion billet 3, which forms a top-opened and bottomed cylindrical shape, is molded.

Next, as shown in FIG. 17D, a bottom portion 3a of the backward extrusion billet 3 is penetrated, and a cylindrical member (pipe-like member) 4 is formed.

Next, as shown in FIG. 17E, as the rolling step, the cylindrical member 4, in which the bottom portion 3a is penetrated, is rolled and expanded in diameter, and in addition, as the groove forming step, grooves 7, which form an annular shape along the outer circumferential surface of the cylindrical member 4, are formed on the same outer circumferential surface. These grooves 7 are rolling grooves in an event where the cylindrical member 4 is applied, for example, as an inner ring of a ball bearing. Note that these rolling step and groove forming step may be of either of cold ones and hot ones. As described above, the grooves 7 can be formed on a large number (here, three) of the annular members 5 by the single rolling molding, and accordingly, there is an effect that a subsequent cutting margin can be reduced, and the number of steps is small.

Next, in a similar way to the above-mentioned cutting and separating step, as shown in FIG. 17F, the cylindrical member 4 is cut over an axial direction thereof, and a plurality of annular members (ring-like members) 5 are fabricated.

Rotation shear that acts on the cylindrical member 4 in this embodiment exhibits a mode shown in FIG. 18 (corresponding to FIG. 3 in the first embodiment); however, portions other than the grooves 7 in the cylindrical member 4 can be urged by the restraining molds 14 and 15, and accordingly, it is possible to perform the cutting and the separation without any problem also in this embodiment.

Eighth Embodiment

Next, a description is made of an eighth embodiment of the method for manufacturing an annular member with reference to the drawings. Note that this embodiment is different from the sixth embodiment only in the groove forming step, and accordingly, a description of constituents, which are similar to those of the above-mentioned embodiment and are denoted by the same reference numerals as those thereof, is sometimes omitted. FIGS. 19A to 19F are cross-sectional views showing an outline of machining of an annular member in the eighth embodiment of the method for manufacturing an annular member.

Figures 19A, 19B, 19C, 19D, 19E, 19F:
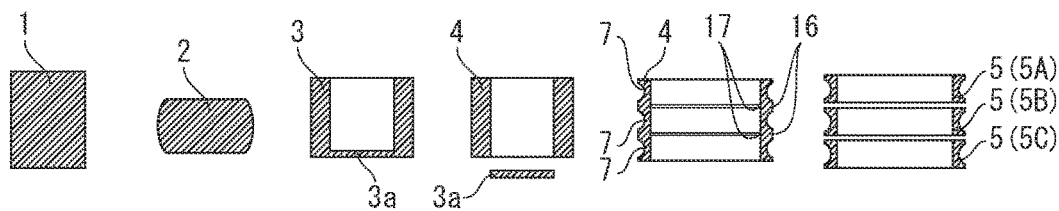
FIGS. 19A to 19F are cross-sectional views showing an outline of machining of an annular member in an eighth embodiment of the method for manufacturing an annular member.
Figures 20A, 20B, 20C, 20D, 20E:
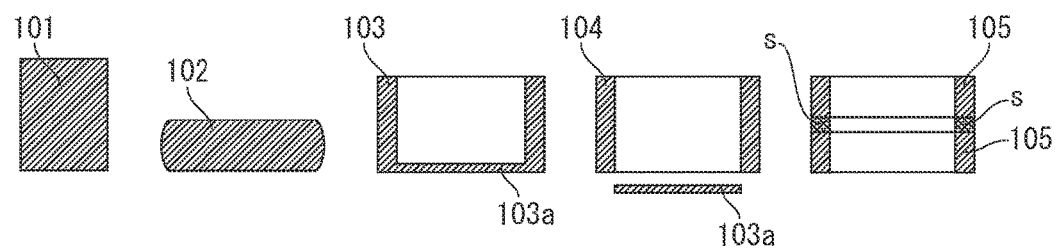
FIGS. 20A to 20E are cross-sectional views showing an outline of machining of an annular member in a conventional method for manufacturing an annular member.

As shown in FIGS. 19A to 19F, in this embodiment, the groove forming step is performed in an event of a rolling step (FIG. 19E). First, by using a round bar member 1 shown in FIG. 19A, a cut billet 2 shown in FIG. 19B is made by any method of press cutting, saw cutting and cutting-off. At this time, in a case where the cut billet 2 is cut out by the press cutting, surface roughness of a cutting section thereof is not acceptable, and accordingly, a crack is prone to occur therein, and a perpendicularity of the cutting section to an axial direction thereof is poor. Therefore, upsetting or end surface correction is performed for the cut billet 2. Note that, in a case where the cut billet 2 is obtained by the saw cutting or the cutting-off, the roughness of the cutting section is acceptable, and a perpendicularity of the cutting section with respect to a billet axis direction is good, and accordingly, the upsetting and the end surface correction do not have to be performed.

Next, as shown in FIG. 19C, the cut billet 2 is subjected to backward extrusion, whereby a backward extrusion billet 3, which forms a top-opened and bottomed cylindrical shape, is molded.

Next, as shown in FIG. 19D, a bottom portion 3a of the backward extrusion billet 3 is penetrated, and a cylindrical member (pipe-like member) 4 is formed.

Next, as shown in FIG. 19E, as the rolling step, the cylindrical member 4, in which the bottom portion 3a is penetrated, is rolled and expanded in diameter, and in addition, notches 16 and 17 are formed. Moreover, as the groove forming step, grooves 7, which form an annular shape along the outer circumferential surface of the cylindrical member 4, are formed on the same outer circumferential surface. These grooves 7 are rolling grooves in an event where the cylindrical member 4 is applied, for example, as an inner ring of a ball bearing. Note that these rolling step and groove forming step may be of either of cold ones and hot ones. As described above, the grooves 7 can be formed on a large number (here, three) of the annular members 5 by the single rolling molding, and accordingly, there is an effect that a subsequent cutting margin can be reduced, and the number of steps is small.

Next, in a similar way to the above-mentioned cutting and separating step, as shown in FIG. 19F, the cylindrical member 4 is cut over an axial direction thereof, and a plurality of annular members (ring-like members) 5 are fabricated.

Rotation shear that acts on the cylindrical member 4 in this embodiment exhibits a mode shown in FIG. 18 (corresponding to FIG. 3 in the first embodiment); however, portions other than the grooves 7 in the cylindrical member 4 can be urged by the restraining molds 14 and 15, and accordingly, it is possible to perform the cutting and the separation without any problem also in this embodiment.

The description is made above of the present invention with reference to the specific embodiments; however, it is not intended to limit the invention by the description of these. For those skilled in the art, other embodiments of the present invention are also obvious together with the variety of disclosed embodiments by referring to the description of the present invention. Hence, it should be understood that the scope of claims covers modification examples or embodiments of these included in the scope and spirit of the present invention. For example, in the above-described embodiments, the annular members 5 are obtained by dividing the cylindrical member 4 into three in the axial direction thereof; however, as long as functions as the annular members 5 are not damaged, the number of annular members 5 is not limited to three, and it is preferable to obtain a larger number of the annular members 5 are obtained. Moreover, in the event of forming the cylindrical member 4, the cylindrical member 4 may be subjected to steps other than the above-mentioned cylindrical member forming step.

REFERENCE SIGNS LIST

1 Round Bar Member
2 Cut Billet
3 Backward Extrusion Billet
4 Cylindrical Member
5 Annular Member
10 Cutting And Separating Device
11 First Roll
12 Second Roll
13 Mandrel
14 Restraining Mold
15 Restraining Mold
16 Notch (Outer Diameter Surface Side)
17 Notch (Inner Diameter Surface Side)

The invention claimed is:

1. A method for manufacturing an annular member, the method comprising: providing a first restraining mold and a second restraining mold, each of which is formed in an annular shape, in an axial direction of a cylindrical member such that inner circumferential surfaces of the first restraining mold and the second restraining mold abut against an outer circumferential surface of the cylindrical member; providing a third restraining mold and a fourth restraining mold, each of which is formed in an annular shape, such that outer circumferential surfaces of the third restraining mold and the fourth restraining mold abut against an inner circumferential surface of the cylindrical member at positions which respectively correspond to positions of the first restraining mold and the second restraining mold in the axial direction; moving a roll that includes a first disc-shaped urging portion that abuts against an outer surface of the first restraining mold and a second disc-shaped urging portion that abuts against an outer surface of the second restraining mold, the first and second disc-shaped urging portions being separated by a cushioning portion having a gap from an outer surface of a fifth restraining mold, a mandrel abutting an inner circumferential surface of a sixth restraining mold; applying a shear force that shifts a portion of the cylindrical member abutting the second restraining mold and the fourth restraining mold by urging the first restraining mold with the first disc-shaped urging portion; and rotating each of the cylindrical member and the roll so as to cut and separate the cylindrical member.

2. The method for manufacturing an annular member according to claim 1, the method further comprising:
forming a notch on at least either one of the inner circumferential surface and the outer circumferential surface of the cylindrical member; and
causing a stress concentration on a spot where the notch is formed so as to cut and separate the cylindrical member over the axial direction.

3. The method for manufacturing an annular member according to claim 1, wherein grooves are formed on the inner circumferential surface or the outer circumferential surface of the cylindrical member by single rolling molding, the grooves being formed between forming of the cylindrical member and cutting and separating of the cylindrical member.

4. The method for manufacturing an annular member according to claim 2, wherein a cross-sectional shape of a bottom portion of the notch is a U-shape.

5. The method for manufacturing an annular member according to claim 2, wherein a cross-sectional shape of a bottom portion of the notch is a rectangular shape.

6. The method for manufacturing an annular member according to claim 2, wherein a cross-sectional shape of a bottom portion of the notch is a V-shape.

7. The method for manufacturing an annular member according to claim 1, wherein the mandrel has a gap from an inner circumferential surface of the third restraining mold.

8. A method for manufacturing a roller bearing, wherein the annular member manufactured by the method for manufacturing an annular member according to claim 1 is applied to a roller bearing.

* * * * *